US012800743B2

(12) United States Patent
Nakano et al.

(10) Patent No.: US 12,800,743 B2
(45) Date of Patent: Nov. 17, 2026

(54) COMMUNICATION APPARATUS, COMMUNICATION SYSTEM, AND COMMUNICATION METHOD

(71) Applicant: Sony Semiconductor Solutions Corporation, Kanagawa (JP)

(72) Inventors: Hiroaki Nakano, Tokyo (JP); Toshiyuki Miyauchi, Kanagawa (JP); Kenichi Fujimaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 562 days.

(21) Appl. No.: 18/261,034

(22) PCT Filed: Dec. 16, 2021

(86) PCT No.: PCT/JP2021/046429

§ 371 (c)(1),
(2) Date: Jul. 11, 2023

(87) PCT Pub. No.: WO2022/153773

PCT Pub. Date: Jul. 21, 2022

(65) Prior Publication Data

US 2024/0085550 A1 Mar. 14, 2024

(30) Foreign Application Priority Data

Jan. 18, 2021 (JP) ................................ 2021-005526

(51) Int. Cl.
*G01S 13/58* (2006.01)
*G01S 7/40* (2006.01)
*G01S 13/84* (2006.01)

(52) U.S. Cl.
CPC ............ *G01S 13/58* (2013.01); *G01S 7/4008* (2013.01); *G01S 13/84* (2013.01)

(58) Field of Classification Search
CPC ...... G01S 13/931; G01S 13/84; G01S 13/584; G01S 13/751; G01S 2013/93271;
(Continued)

(56) References Cited

U.S. PATENT DOCUMENTS

2008/0143584 A1 6/2008 Shoarinejad
2009/0243932 A1* 10/2009 Moshfeghi ............ G01C 21/20
342/378

(Continued)

FOREIGN PATENT DOCUMENTS

EP 3147685 A1 * 3/2017 ............ G01S 13/90
JP 2010223593 A 10/2010

(Continued)

OTHER PUBLICATIONS

International Search Report (PCT/ISA/210), International Application No. PCT/JP2021/046429, dated Feb. 15, 2022.

*Primary Examiner* — Olumide Ajibade Akonai
(74) *Attorney, Agent, or Firm* — Michael Best & Friedrich LLP

(57) ABSTRACT

[Object]
Distance information can be acquired with a high degree of accuracy by a simple configuration, and positioning of high reliability is performed.
[Solving Means]
A communication apparatus includes a phase acquisition unit that acquires a phase characteristic of a frequency in a propagation channel with a different communication apparatus, a distance generation unit that generates distance information in reference to the phase characteristic, and a speed sensor unit that measures a movement speed of a transmission side of the propagation channel, the movement speed being usable for correction of the phase characteristic.

18 Claims, 11 Drawing Sheets

(58) Field of Classification Search
CPC ...... G01S 13/765; G01S 13/347; G01S 13/58; G01S 13/767; G01S 7/4008; G01S 7/006; G01S 13/5242; G01S 13/582; G01S 7/40; G01S 13/86
See application file for complete search history.

(56) References Cited

U.S. PATENT DOCUMENTS

| | | | | |
|---|---|---|---|---|
| 2020/0132812 | A1* | 4/2020 | Dvorecki | G01S 13/931 |
| 2020/0326403 | A1* | 10/2020 | Romme | G01S 5/02685 |
| 2020/0395978 | A1* | 12/2020 | Romme | G01S 13/84 |
| 2022/0066019 | A1* | 3/2022 | Waheed | G01S 13/84 |
| 2022/0095262 | A1* | 3/2022 | Kazaz | G01S 13/84 |
| 2022/0222988 | A1* | 7/2022 | Elangovan | H04B 15/00 |
| 2023/0409041 | A1* | 12/2023 | Servant | G05D 1/0094 |

FOREIGN PATENT DOCUMENTS

| | | | |
|---|---|---|---|
| JP | 2012103162 | A | 5/2012 |
| JP | 2018048821 | A | 3/2018 |
| JP | 2018124181 | A | 8/2018 |
| JP | 2020026970 | A | 2/2020 |
| JP | 2020134169 | A | 8/2020 |
| WO | 2020077222 | A1 | 4/2020 |

* cited by examiner

COMMUNICATION APPARATUS, COMMUNICATION SYSTEM, AND COMMUNICATION METHOD

TECHNICAL FIELD

The present disclosure relates to a communication apparatus, a communication system, and a communication method.

BACKGROUND ART

In recent years, an indoor positioning technology is attracting attention. Since radio waves of satellites do not reach indoors, there is a challenge that a signal of the GPS (Global Positioning system) or the GNSS (Global Navigation Satellite System) cannot be received, and various techniques have been proposed. For example, PDR (Pedestrian Dead Reckoning: pedestrian autonomous navigation) of measuring an action of a user and an amount of the action by multiple sensors such as an acceleration sensor and a gyro sensor, a technique of inferring a position by collation of geomagnetic data, a technique of estimating a distance by flight hours from projection of light to reception thereof (ToF: Time of Flight), and so forth are available.

CITATION LIST

Patent Literature

[PTL 1]
Japanese Patent Laid-Open No. 2018-124181
[PTL 2]
Japanese Patent Laid-Open No. 2010-223593

SUMMARY

Technical Problems

However, the technique of PDR has a challenge in lacking, while ranging errors are accumulated, means for correcting the ranging errors. Meanwhile, the technique that requires data collation of geomagnetism data or the like has a significant problem in terms of operation in that creation of a map in advance is essentially required and, when the layout is to be changed or when the map changes, re-creation of collation data is required. The ToF technique has a problem in that the influence of shadowing (degradation of the ranging performance by the human body) is great and a correct distance cannot be measured unless in a line-of-sight environment.

In order to solve the problems described above, attention has been paid for some time on a ranging technique using a wireless signal. This is because many wireless communication ICs of BLE (Bluetooth® Low Energy), Wifi, LTE (Long Term Evolution), or the like are already built in smartphones, advance learning or the like is unnecessary, and development to applications is facilitated. However, the ranging technique using a wireless signal has a challenge in that its ranging accuracy is low.

A technique that uses an RSSI (Received Signal Strength Indicator: received signal strength) is being commercialized as a current solution. While this is a technique of determining that the distance is small if the signal is great and that the distance is great if the signal is small, this technique is known to be liable to be influenced by multipath (reflected waves). Further, the technique has a problem in that a great error occurs with the received signal strength.

As a method for solving such problems as described above, attention is paid to a phase base method that generates a distance from a phase difference between a transmission signal and a reception signal. However, in a case where the transmission side moves, there is a possibility of occurrence of a measurement error. As such, the present disclosure provides a communication apparatus, a communication system, and a communication method capable of acquiring distance information with a high degree of accuracy by a simple configuration and performing positioning with a high degree of reliability.

Solution to Problems

In order to solve the challenges described above, according to the present disclosure, there is provided a communication apparatus including a phase acquisition unit that acquires a phase characteristic of a frequency in a propagation channel with a different communication apparatus, a distance generation unit that generates distance information in reference to the phase characteristic, and a speed sensor unit that measures a movement speed of a transmission side of the propagation channel, the movement speed being usable for correction of the phase characteristic.

The communication apparatus may include a communication unit that transmits the distance information and the height information to a processing device.

The distance generation unit may generate the distance information in reference to the phase characteristic and the movement speed.

The distance generation unit may generate the distance information by using group delay information based on at least two phase differences of different frequencies in the propagation channel.

The distance generation unit may correct the phase characteristic by the movement speed.

The speed sensor unit may be one of an acceleration sensor and an inertial measurement unit in which multiple sensors are combined.

The speed sensor unit may measure the movement speed in synchronism with the acquisition of the phase characteristic.

The BLE communication method may be used for transmission and reception in the propagation channel.

The distance generation unit may correct the phase characteristic according to a movement direction based on a time change of the distance information.

The communication apparatus may further include a direction sensor unit that measures a movement direction of the transmission side of the propagation channel.

The phase acquisition unit may measure the phase characteristic by transmission and reception to and from the different communication apparatus.

The communication apparatus may further include an antenna used for transmission and reception to and from the different communication apparatus, and the phase acquisition unit may generate the phase characteristic according to transmission and reception signals through the antenna.

According to the present disclosure, there is provided a communication system that includes first and second communication apparatuses that transmit and receive a measurement signal to and from each other, in which the first communication apparatus includes a phase acquisition unit that acquires a phase characteristic of a frequency in a propagation channel when the measurement signal is transmitted to or received from the second communication apparatus, a distance generation unit that generates distance information in reference to the phase characteristic, and a speed sensor unit that measures a movement speed of a transmission side of the propagation channel, the movement speed being usable for correction of the phase characteristic.

According to the present disclosure, there is provided a communication method including the steps of generating a phase characteristic of a frequency in a propagation channel with a different communication apparatus, measuring a movement speed of a transmission side of the propagation channel, and correcting the phase characteristic by the movement speed to generate distance information.

DESCRIPTION OF EMBODIMENTS

In the following, embodiments of a communication apparatus, a communication system, and a communication method are described with reference to the drawings. Although the following description is given focusing on principal components of the communication apparatus and the communication system, components and functions that are not depicted or described possibly exist in the communication apparatus and the communication system. The following description does not exclude such components and functions that are not depicted or described.

First Embodiment

Figure 1:
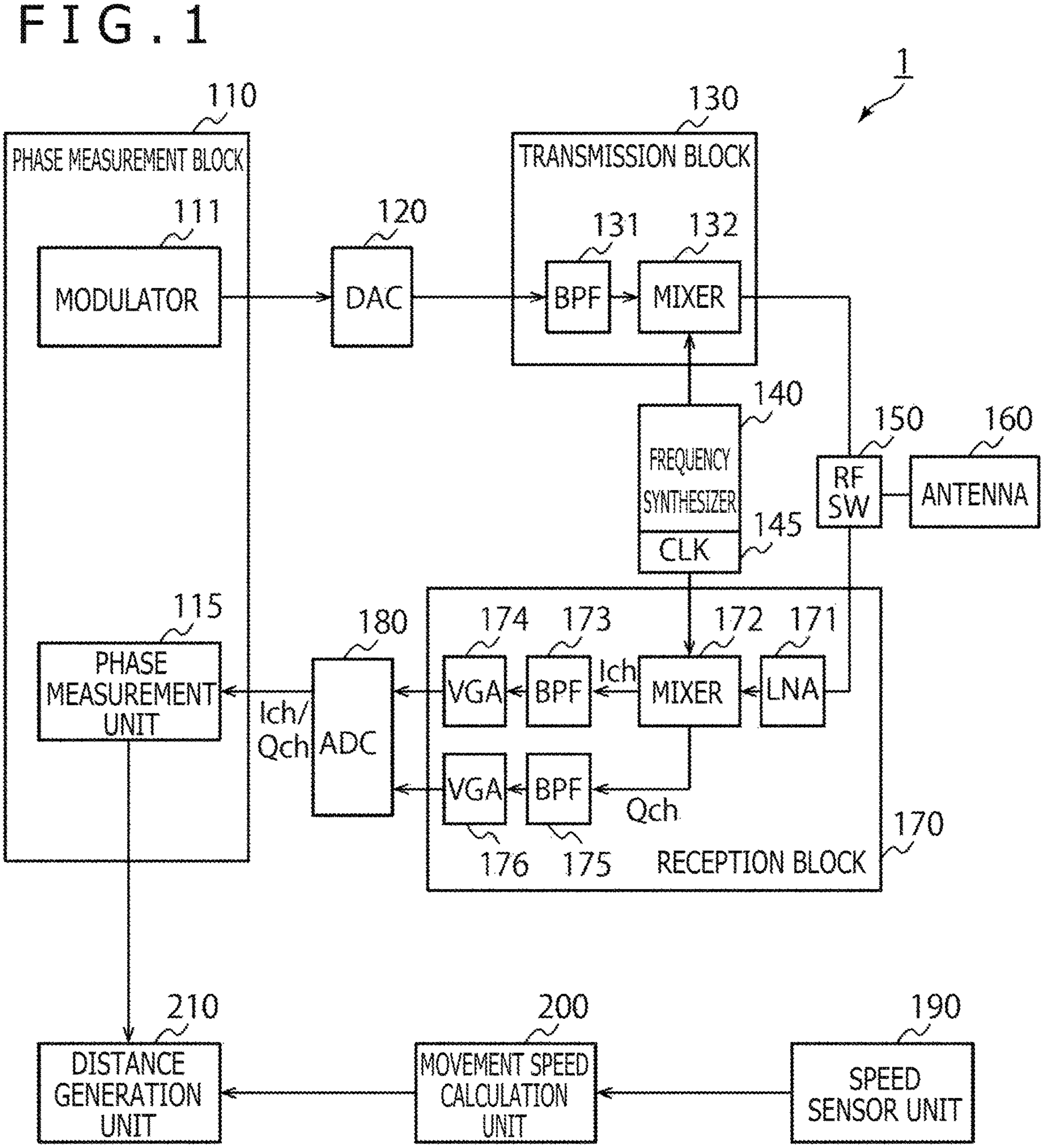
FIG. 1 is a block diagram depicting a configuration of principal part of a communication apparatus according to a first embodiment.

FIG. 1 is a diagram depicting an example of a configuration of a communication apparatus 1 according to a first embodiment of the present technology.

The communication apparatus 1 includes a phase measurement block 110, a DAC 120, a transmission block 130, a frequency synthesizer 140, an RF switch 150, an antenna 160, a reception block 170, an ADC 180, a speed sensor unit 190, a movement speed calculation unit 200, and a distance generation unit 210. The communication apparatus 1 is capable of performing communication with use of, for example, the BLE (Bluetooth (registered trademark) Low Energy) method. With the BLE method, the length of time required for an action that requires high electric power such as connection establishment or data communication can be reduced to the utmost. Hence, power consumption can be suppressed, and the communication apparatus 1 can be downsized.

The phase measurement block 110 is a block that measures a phase characteristic of a frequency in a propagation channel with a different communication apparatus. The phase measurement block 110 includes a modulator 111 and a phase measurement unit 115. The modulator 111 performs a modulation process of a signal for performing communication. In the following description, the modulator 111 performs, for example, IQ modulation as an example of the modulation process. In the IQ modulation, as a baseband signal, signals of the I channel (In-phase: same phase component) and the Q channel (Quadrature: quadrature component) are used.

The phase measurement unit 115 measures a phase characteristic of a frequency in a propagation channel with a different communication apparatus. The phase measurement unit 115 measures the phase characteristic for each frequency in reference to data of signals of the I channel and the Q channel from the ADC 180. It is to be noted that the phase measurement block 110 in the present embodiment corresponds to a phase acquisition unit.

The DAC (Digital-to-Analog Converter) 120 converts a digital signal from the modulator 111 into an analog signal. The analog signal obtained by the conversion by the DAC 120 is supplied to the transmission block 130.

The transmission block 130 is a block that transmits a signal by wireless transmission. The transmission block 130 includes a BPF 131 and a mixer 132. The BPF (Band-Pass Filter) 131 allows only a signal in a specific frequency band to pass therethrough. In particular, the BPF 131 supplies, to the mixer 132, only a signal in the specific frequency band among the analog signals from the DAC 120. The mixer 132 mixes a local oscillation frequency supplied from the frequency synthesizer 140 with the signal supplied from the BPF 131, to convert the signal into a signal of a transmission frequency for wireless communication.

The frequency synthesizer 140 supplies a frequency to be used for transmission and reception. The frequency synthesizer 140 includes a local oscillator (clock: CLK) 145 in the inside thereof and is used for conversion between a high frequency signal and a baseband signal for wireless communication.

The RF switch 150 is a switch that switches a high frequency (RF: Radio Frequency) signal. The RF switch 150 connects the transmission block 130 to the antenna 160 upon transmission and connects the reception block 170 to the antenna 160 upon reception. The antenna 160 is an antenna for performing transmission and reception by wireless communication.

The reception block 170 is a block that receives a signal by wireless communication. The reception block 170 includes an LNA 171, a mixer 172, BPFs 173 and 175, and VGAs 174 and 176. The LNA (Low Noise Amplifier) 171 amplifies an RF signal received by the antenna 160. The mixer 172 mixes a local oscillation frequency supplied from the frequency synthesizer 140 with a signal supplied from the LNA 171, to convert the signal into signals of the I channel and the Q channel. The signal of the I channel is supplied to the BPF 173, and the signal of the Q channel is supplied to the BPF 175. The BPFs 173 and 175 allow only a signal in a specific frequency band to pass therethrough, similarly to the BPF 131. The VGAs (Variable Gain Amplifiers) 174 and 176 are analog variable gain amplifiers that adjust the gain of signals from the BPFs 173 and 175, respectively.

The ADC (Analog-to-Digital Converter) 180 converts signals of the I channel and the Q channel from the reception block 170 from analog signals into digital signals.

The speed sensor unit 190 is a sensor that measures the speed. For the speed sensor unit 190, a general speed sensor can be used. The speed sensor unit 190 is, for example, an acceleration sensor. For example, it is possible to obtain a speed by time-integrating an output signal of the acceleration sensor.

As the acceleration sensor, it is possible to use a composite sensor that includes therein an acceleration sensor represented, for example, by an inertial measurement unit (IMU). Alternatively, a sensor that does not include an acceleration sensor therein may be used.

The movement speed calculation unit 200 calculates the speed of the communication apparatus 1 in reference to an output signal of the speed sensor unit 190.

The distance generation unit 210 generates a distance to a measurement target by using phase information measured by the phase measurement block 110 and movement speed information calculated by the movement speed calculation unit 200. It is to be noted that details of the distance generation unit 210 are described later.

Figure 2:
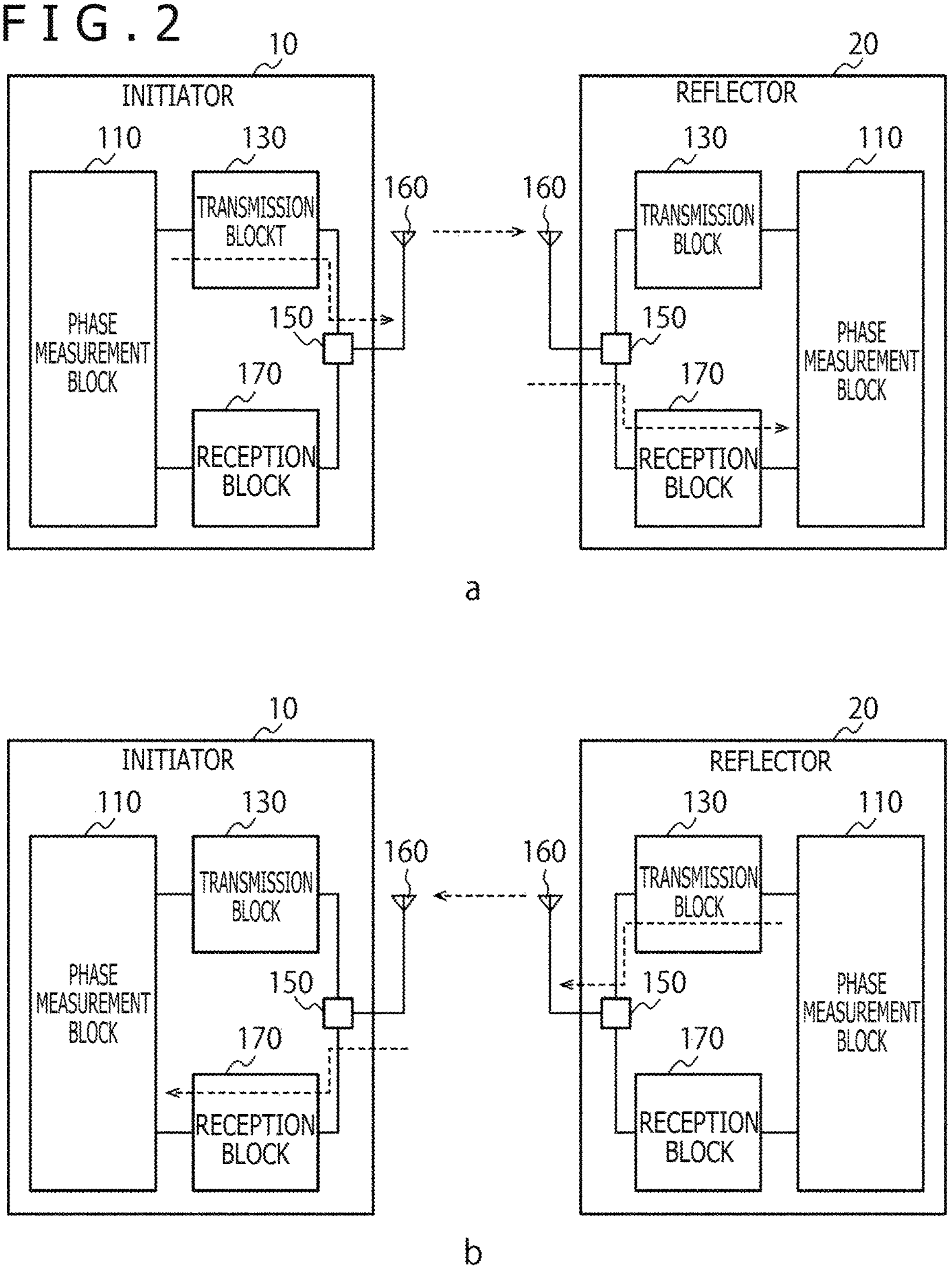
FIG. 2 illustrates diagrams depicting an example of a mode of phase measurement of a communication system in the first embodiment.

FIG. 2 is a diagram depicting an example of a mode of phase measurement of the communication system according to the first embodiment. When a phase is to be measured between communication apparatuses, a measurement signal is first transmitted from one (initiator 10) of the communication apparatuses toward the other (reflector 20) of the communication apparatuses as indicated in a of FIG. 2. The communication apparatus described hereinabove can be used as any of the initiator 10 and the reflector 20.

In this example, only main blocks relating to phase measurement are depicted. In particular, in the initiator 10, a measurement signal from the phase measurement block 110 is transmitted from the antenna 160 past the transmission block 130. On the other hand, in the reflector 20, the measurement signal is received by the reception block 170 via the antenna 160.

Further, the measurement signal is transmitted back from the reflector 20 toward the initiator 10 as depicted in b of FIG. 2. In particular, in the reflector 20, the measurement signal from the phase measurement block 110 is transmitted from the antenna 160 past the transmission block 130. Meanwhile, in the initiator 10, the measurement signal is received by the reception block 170 via the antenna 160, and a phase characteristic between them is measured by the phase measurement block 110. Performing round-trip communication in such a manner makes it possible to measure the phase characteristic between the communication apparatuses.

Figure 3:
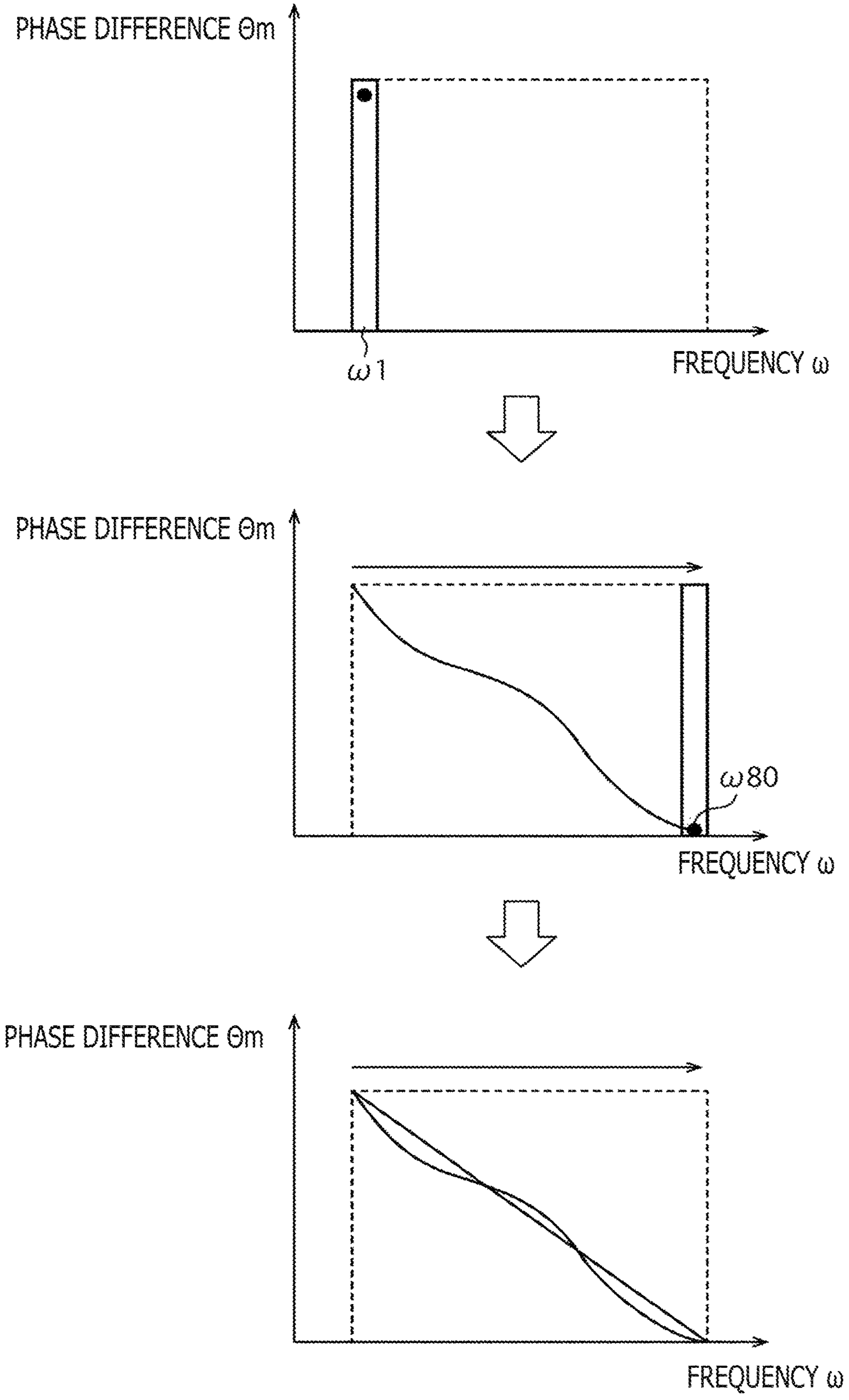
FIG. 3 is a diagram depicting a measurement result of a phase measurement unit with regard to a frequency in each channel.

Here, a detailed process of the distance generation unit 210 is described with reference to FIGS. 3 to 6. FIG. 3 is a diagram depicting a result of measurement by the phase measurement unit 115, for example, with regard to frequencies ω1 to ω80 in 80 channels. The axis of ordinate indicates a phase difference θm measured by the phase measurement unit 115, and the axis of abscissa indicates the frequency. For example, the frequencies are ω1 to ω80 of the 2.4 GHz band in 80 channels. The upper view indicates a result of measurement of the frequency ω1. The middle view indicates a result of measurement of the frequency ω80. Further, the lower view indicates a result of measurement of the frequencies ω1 to ω80. When the axis of abscissa indicates the frequency ω and the axis of ordinate indicates the phase difference θm as depicted in FIG. 3, the phase difference θm varies according to the frequency. It is to be noted that, although the present embodiment is described using an example having 80 channels, this is not restrictive. For example, ranging is possible if measurement results of two or more channels are available.

The distance generation unit 210 calculates a group delay T from the gradient of the phase difference θm and generates a distance in a case where the speed calculated by the movement speed calculation unit 200 is equal to or lower than a predetermined value. The group delay T is a result of differentiation of the phase difference θm between an input waveform and an output waveform with the angular frequency ω. In regard to the phase, since a difference of a phase from another phase offset by any integral number of times of 2π cannot be distinguished, the group delay τ is used as an index for representing a characteristic of a filter circuit.

When the phase difference between a transmission signal and a reception signal is represented by θd; the measured phase is represented by θm; the distance of the propagation channel is represented by D; and the velocity of light is represented by c (=299792458 m/s), the expression (1) is satisfied. The phase difference θd is sometimes referred to as a rotation phase.

$$\theta d(=\theta m+2\pi n)=\omega td=\omega\times 2D/c \tag{1}$$

When both sides of the expression (1) are differentiated with the angular frequency ω, the expression (2) is obtained.

$$d\theta d/d\omega=d\theta m/d\omega=2D/c \tag{2}$$

When the expression (2) is transformed, the distance D is calculated by the expression (3).

$$D=(c/2)\times(d\theta m/d\omega) \tag{3}$$

As depicted in FIG. 3, the phase measurement unit 115 measures the phase characteristic of the frequency in the propagation channel with a different communication apparatus. In such a manner, if the speed is, for example, 0, then if the distance generation unit 210 measures the phase difference θm and obtains the gradient of the phase difference θm (differentiated value with the angular frequency ω), distance information can be generated in reference to the phase characteristic.

As can be recognized from the expressions (1) to (3), since the gradient information of the phase difference θm with regard to the frequency is used, this corresponds to calculating the distance from relative difference information of the frequencies. Hence, since the distance does not rely upon an absolute value of a circuit delay, a dispersion value by a temperature characteristic, and so forth of each block, the measurement accuracy further increases.

Figure 4:
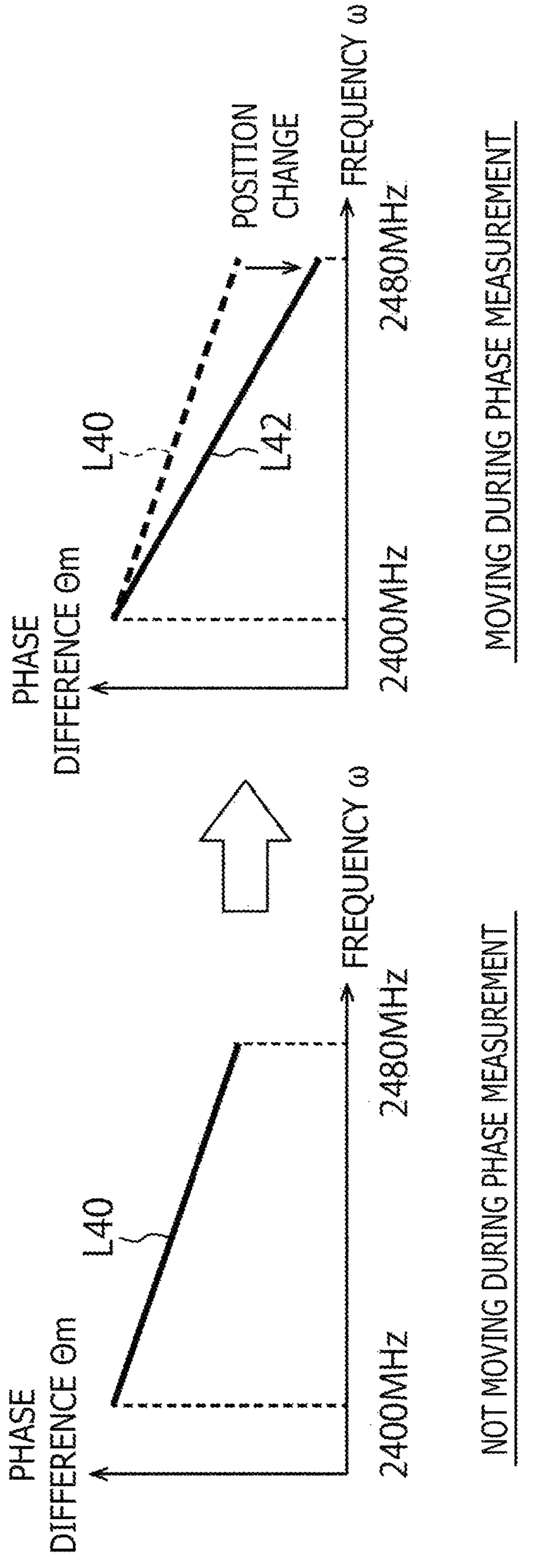
FIG. 4 is a diagram depicting a challenge in a case where the communication apparatus is moving.

FIG. 4 is a diagram depicting a challenge in a case where the communication apparatus 1 is moving. The axis of ordinate indicates the phase difference θm measured by the phase measurement unit 115, and the axis of abscissa indicates the frequency. For example, the frequencies are ω1 to ω80 of the 2.4 GHz band in 80 channels. The left view indicates a measurement result L40 of the phase difference θm with regard to the frequency ω in a case where the communication apparatus 1 is stopped. The right view indicates a measurement result L42 of the phase difference θm with regard to the frequency ω in a case where the communication apparatus 1 is moving.

As described hereinabove, in the measurement method for the phase difference θm measured by the phase measurement unit 115, ranging is performed in reference to the phase difference when the frequency changes. In a case where the position of the communication apparatus 1 changes during measurement, the measurement result L42 is obtained, and this is displaced from the measurement result L40 that is a true value.

In such a manner, it is difficult to distinguish whether the difference between the measurement result L40 and the measurement result L42 is a phase change caused by a change in frequency or is a phase change caused by a change in position. This gives rise to occurrence of an error in a ranging result.

More particularly, it is assumed that the movement speed of the communication apparatus 1 is 10 km/h. It is assumed that the total phase measurement time period at the time of frequency sweep (2400 MHz to 2480 Mhz, 1 MHz step) is 10 msec. Since 10 km/h corresponds to approximately 0.28 cm/msec, a change of approximately 2.8 cm occurs in 10 msec. For example, since the wavelength at 2.480 GHz is approximately 12.5 cm, phase rotation of 2.8/12.5*360=80.64° occurs by the movement, and this becomes a ranging error as it is.

The moving distance DV during frequency sweep is represented by the expression (4) using a movement speed V, a frequency sweep time period Ts, and a wavelength λ. Here, in order to simplify the description, it is assumed that, for example, the average movement speed for the frequency sweep time period Ts is V and the wavelength λ is the wavelength of the last channel.

$$DV = V \times Ts \tag{4}$$

When the moving distance at the last channel is represented by DV, a corrected phase difference θm' at the last channel is represented by the expression (5).

$$\theta m' = \theta m - DV/(\lambda \times 360) \tag{5}$$

Similarly, calculating the moving distance DV at each channel makes it possible to calculate the corrected phase difference θm' for each channel.

Consequently, it is possible to indicate the expression (1) as the expression (6), and when both sides of the expression (6) are differentiated with the angular frequency ω, the expression (7) is obtained. Here, it is assumed that, in a case where the communication apparatus 1 is moving away from the measurement target, the moving distance DV is indicated with the positive sign, and in a case where the communication apparatus 1 is moving toward the measurement target, the moving distance DV is indicated with the negative sign.

$$\theta d' = \theta m' + 2\pi n \tag{6}$$

When both sides of the expression (6) are differentiated with the angular frequency ω, the expression (7) is obtained.

$$d\theta d'/d\omega = d\theta m'/d\omega = 2D/c \tag{7}$$

When the expression (7) is transformed, the distance D after correction is calculated by the expression (8).

$$D = (c/2) \times (d\theta m'/d\omega) \tag{8}$$

Figure 5:
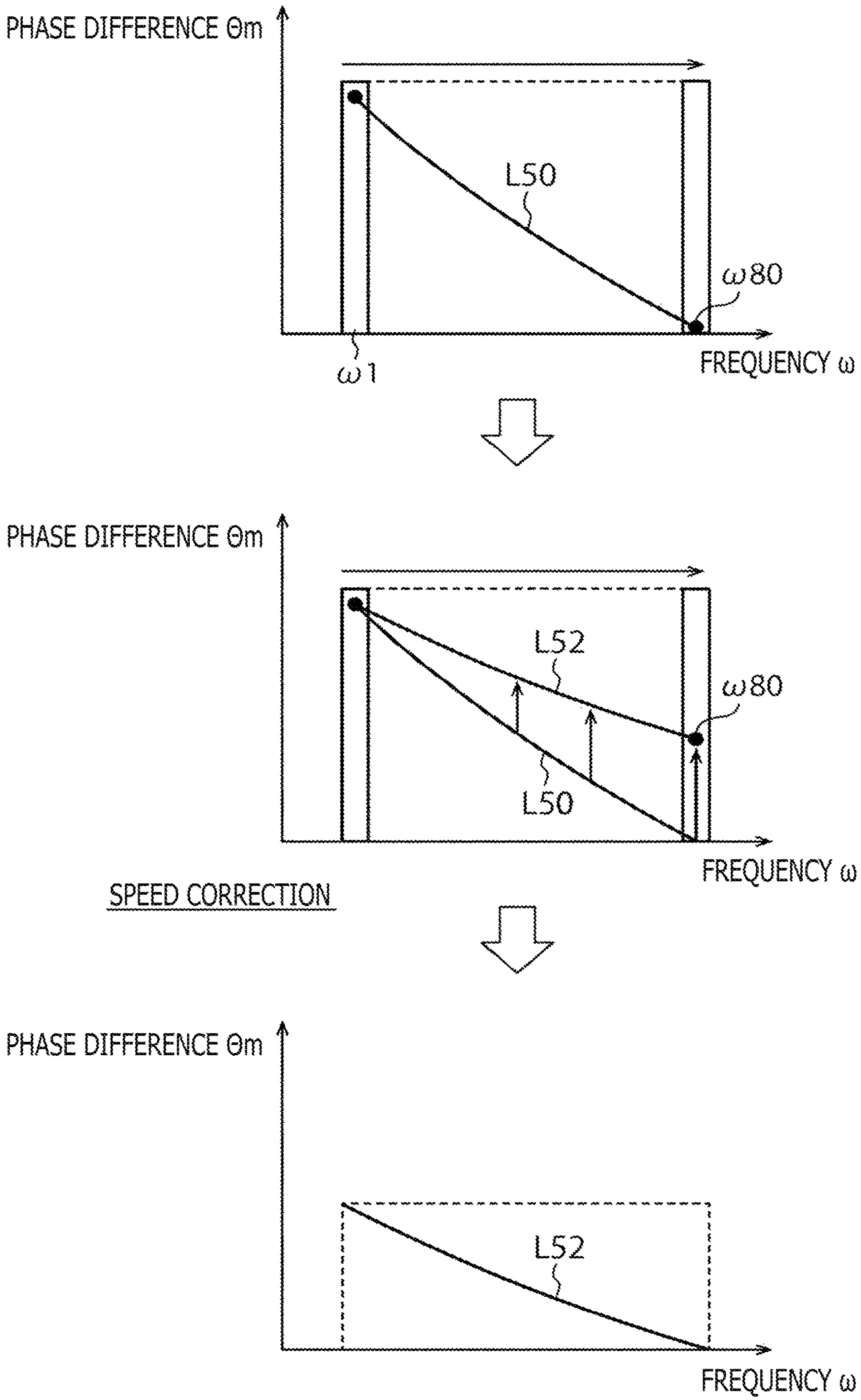
FIG. 5 is a diagram depicting an example of speed correction in a case where the communication apparatus is moving away from a measurement target.

FIG. 5 is a diagram depicting an example of speed correction in a case where the communication apparatus 1 is moving away from the measurement target. The upper view of FIG. 5 is a diagram in which the phase difference θm that is a result of measurement by the phase measurement unit 115 with regard to the frequencies ω1 to ω80 in 80 channels is indicated by a line L50. The axis of ordinate indicates the phase difference θm measured by the phase measurement unit 115, and the axis of abscissa indicates the frequency ω. For example, the frequencies are ω1 to ω80 of the 2.4 GHz band in 80 channels. It is to be noted that the frequency band is not limited to the 2.4 GHz band of ω1 to ω80 in 80 channels, and the correction is possible if measurement of 2 channels of desired frequencies is possible.

The middle view of FIG. 5 is a diagram schematically depicting speed correction according to the expression (5). A line L52 indicates the corrected phase amount θm' obtained by correcting the line L50 according to the expression (5). The length of an arrow mark schematically indicates a correction amount for each channel. For example, the length of the arrow mark of ω80 corresponds to DV/(λ×360) that is the correction amount at ω80. In particular, FIG. 5 depicts the correction amount in a case where the communication apparatus 1 is moving away from the measurement target. The lower view of FIG. 5 is a diagram in which the corrected phase amount θm' obtained by speed-correcting the phase difference for each channel according to the expression (5) is indicated by the line L52.

Figure 6:
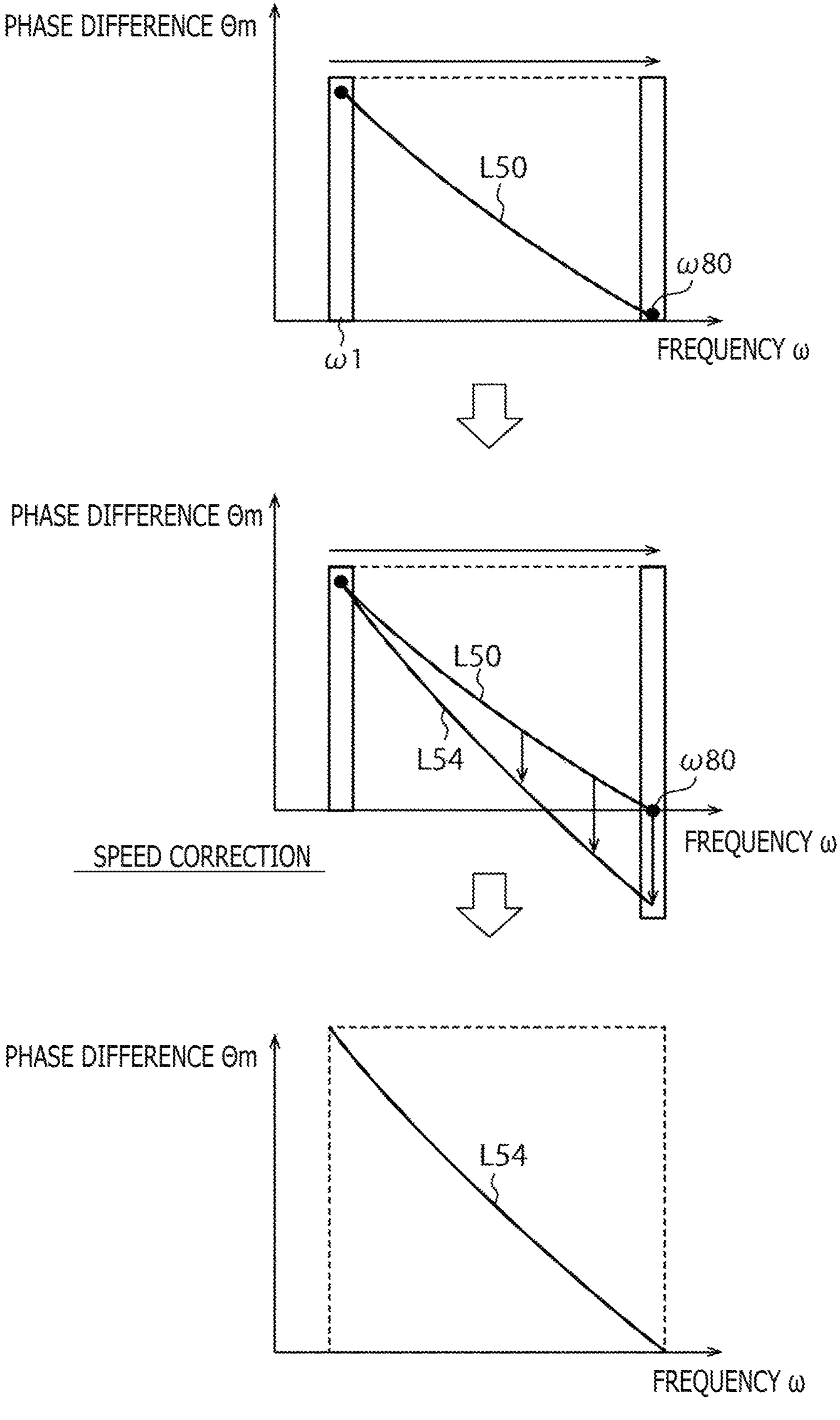
FIG. 6 is a diagram depicting an example of speed correction in a case where the communication apparatus is moving toward a measurement target.

FIG. 6 is a diagram depicting an example of speed correction in a case where the communication apparatus 1 is moving toward the measurement target. The upper view of FIG. 6 is a diagram in which the phase difference θm that is a result of measurement by the phase measurement unit 115 with regard to the frequency, for example, the frequencies ω1 to ω80 in 80 channels, is indicated by a line L770. The axis of ordinate indicates the phase difference θm measured by the phase measurement unit 115, and the axis of abscissa indicates the frequency. For example, the frequencies are ω1 to ω80 of the 2.4 GHz band in 80 channels.

The middle view of FIG. 6 is a diagram schematically depicting speed correction according to the expression (5). A line L54 indicates the corrected phase amount θm' obtained by correcting the line L50 according to the expression (5). The length of an arrow mark of ω80 corresponds to DV/(λ×360). In particular, FIG. 6 depicts the speed correction in a case where the communication apparatus 1 is moving nearer from the measurement target. The lower view of FIG. 6 is a diagram in which the corrected phase amount θm' obtained by speed correction according to the expression (5) is indicated by the line L54.

Figure 7A:
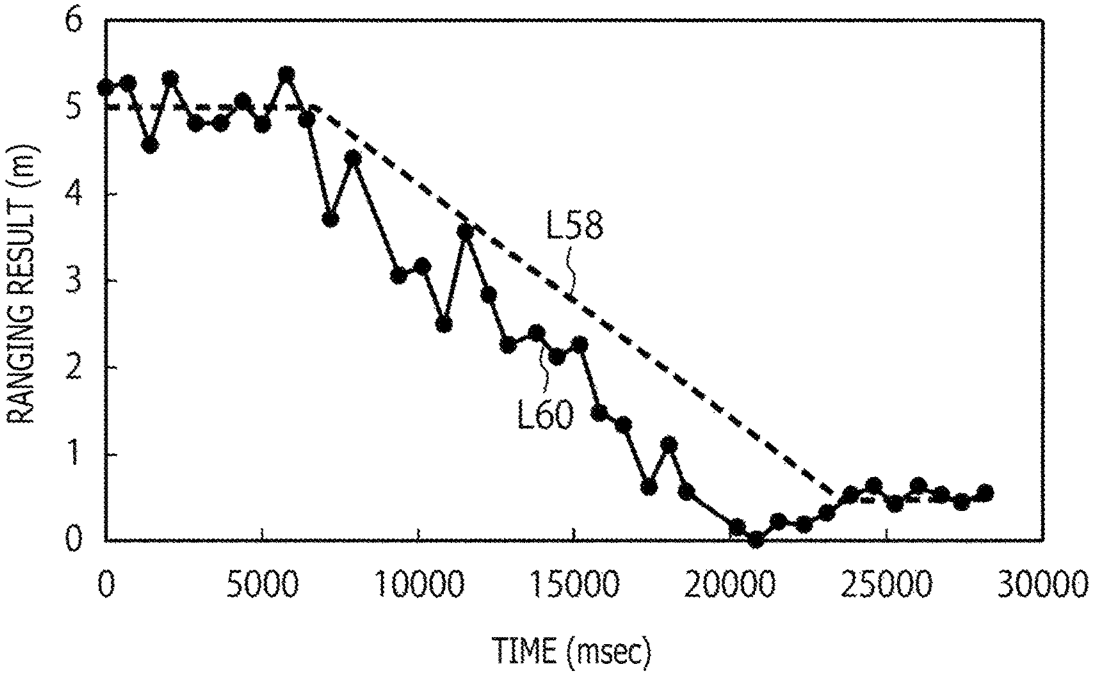
FIG. 7A is a diagram depicting a result of a ranging distance by a movement speed in a case where the communication apparatus is moving toward a measurement target.

FIG. 7A is a diagram depicting a result of a ranging distance by a movement speed in a case where the communication apparatus 1 is moving toward the measurement target. The axis of abscissa indicates the measurement time, and the axis of ordinate indicates the ranging result. A line L58 indicates a correct value, and a line L60 indicates a ranging result in a case where speed correction is not performed. The line L60 has an offset (amount of phase rotation by the movement) with respect to the line L58.

Figure 7B:
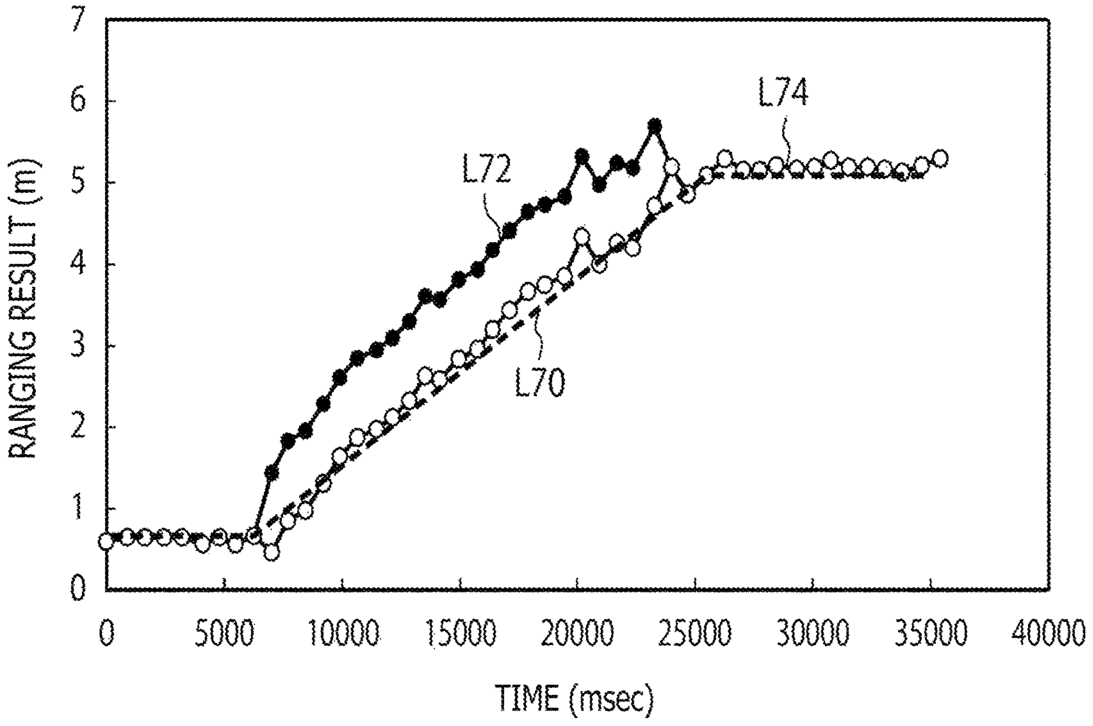
FIG. 7B is a diagram depicting a result of ranging distance correction by a movement speed.

FIG. 7B is a diagram depicting a result of ranging distance correction by a movement speed. The axis of abscissa indicates the measurement time, and the axis of ordinate indicates a result of ranging. A line L70 indicates a correct value, and a line L72 indicates a result of ranging in a case where speed correction is not performed. Further, a line L74 indicates a result of correction using movement speed information. With the movement speed information being used, the influence of the offset (amount of phase rotation by the movement) of the ranging result is corrected. It is to be noted that, also in regard to the line L60 of FIG. 7A, the value of the phase difference can be made closer to the line L58 by performance of ranging distance correction with use of the movement speed information. Further, in calculation of the movement speed, for example, an amount of rotation of a moving article may be acquired by a different sensor (such as the IMU described hereinabove) and used for correction of the movement speed. Furthermore, some other correction for calculating a movement speed may be performed to improve the accuracy.

Figure 8:
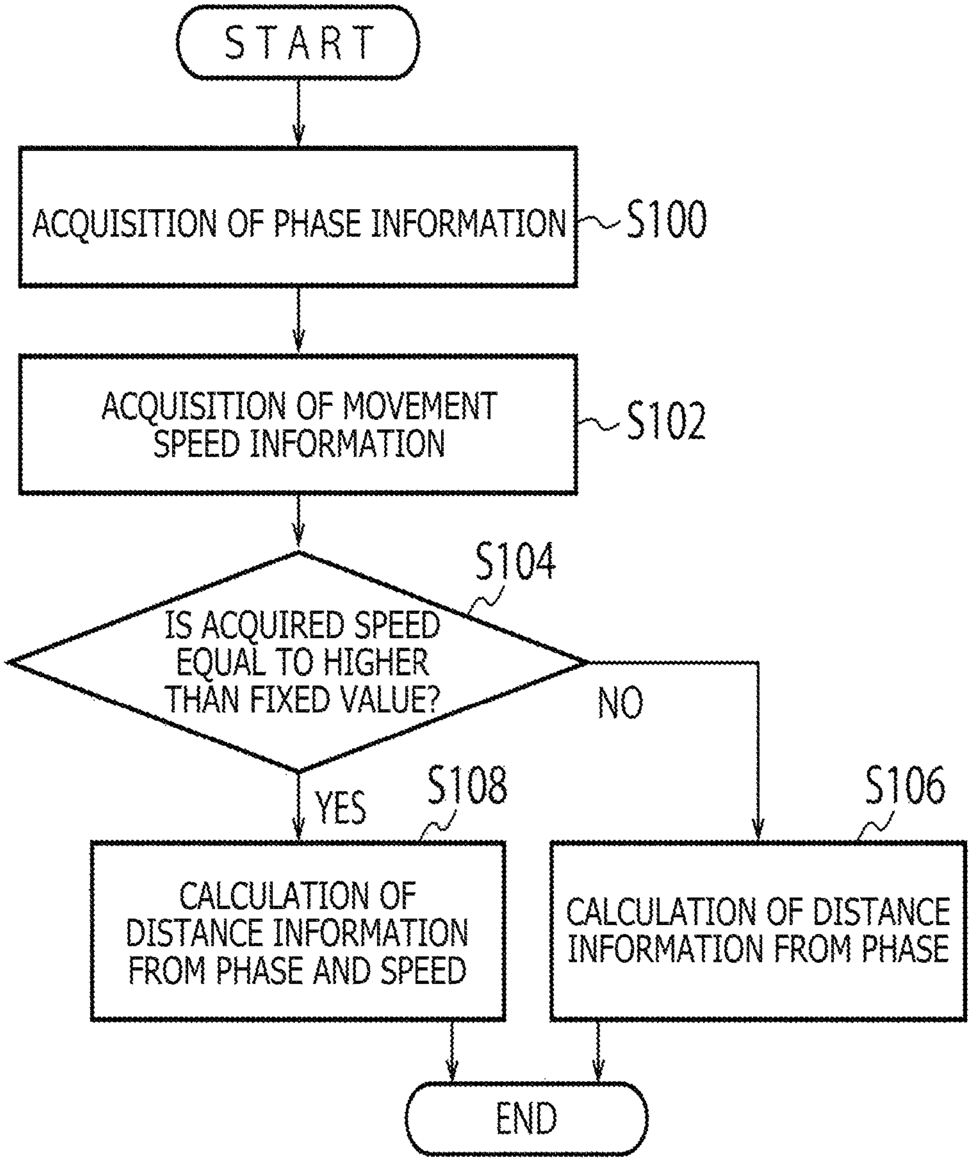
FIG. 8 is a flow chart depicting an example of processing of the communication apparatus.

FIG. 8 is a flow chart depicting an example of processing of the communication apparatus 1 according to the present embodiment. As depicted in FIG. 8, the distance generation unit 210 first acquires information regarding the phase difference θm measured by the phase measurement unit 115 (step S100). Next, the distance generation unit 210 acquires speed information regarding the communication apparatus 1 corresponding to each channel during frequency sweep from the movement speed calculation unit 200 (step S102).

Thereafter, the distance generation unit 210 determines whether or not the speed of the communication apparatus 1 is equal to or higher than a predetermined value by using the speed information regarding the communication apparatus 1 during frequency sweep (step S104). Here, the predetermined value is a speed determined in reference to a measurement error of the speed sensor unit 190. For example, the predetermined value is a speed corresponding to the measurement error of the speed sensor unit 190.

Subsequently, in a case where the speed of the communication apparatus 1 is lower than the predetermined value (No in step S104), the distance generation unit 210 calculates distance information, for example, according to the expressions (1) to (3) without using the speed information (step S106) and then ends the processing. On the other hand, in a case where the speed of the communication apparatus 1 is equal to or higher than the predetermined value (Yes in step S104), the distance generation unit 210 calculates distance information, for example, according to the expressions (4) to (8) with use of the speed information (step S108) and then ends the processing.

As described above, according to the present embodiment, a moving distance corresponding to each channel is calculated using the speed information regarding the communication apparatus 1, and a phase difference corresponding to each moving distance is used to generate a corrected phase difference θm'. Accordingly, the measurement error that could be caused by movement of the communication apparatus 1 during measurement can be suppressed. Hence, the distance to the measurement target can be measured with a higher degree of accuracy. Further, in a case where the speed of the communication apparatus 1 is equal to or lower than the predetermined value, the communication apparatus 1 generates a distance to the measurement target without using the speed information regarding the communication apparatus 1. Consequently, the influence of the measurement error of the speed sensor unit 190 can be suppressed.

Second Embodiment

The communication apparatus 1 according to the second embodiment is different from the communication apparatus 1 according to the first embodiment in that it further includes a control section 220 that controls synchronization of the channels of a measurement signal generated by the phase measurement block 110, the speed sensor unit 190, and the distance generation unit 210. In the following description, differences from the communication apparatus 1 according to the first embodiment are described.

Figure 9:
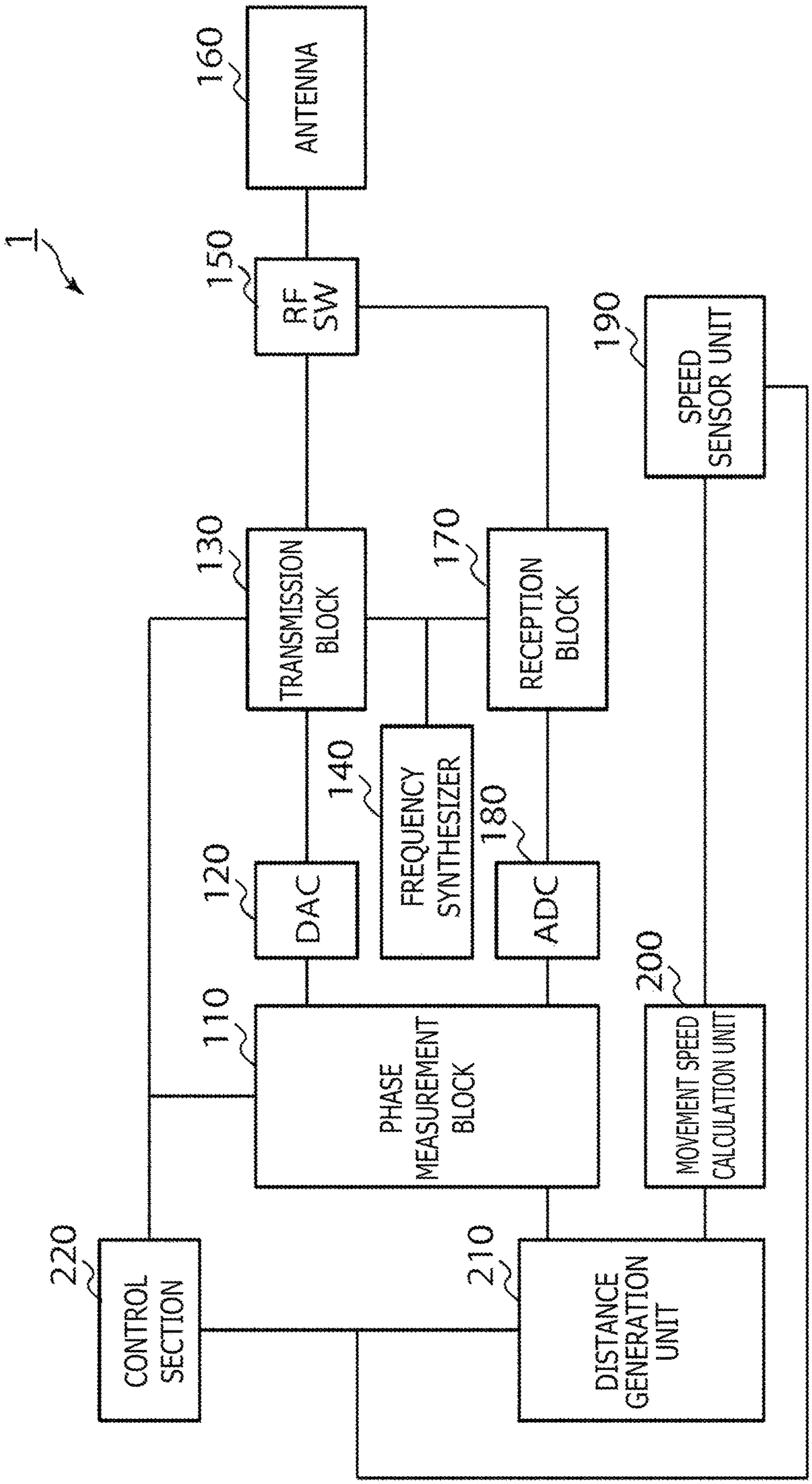
FIG. 9 is a diagram depicting an example of a configuration of a communication apparatus in a second embodiment.

FIG. 9 is a diagram depicting an example of a configuration of the communication apparatus 1 according to the second embodiment of the present technology. As depicted in FIG. 9, the communication apparatus 1 according to the second embodiment is different from the communication apparatus 1 according to the first embodiment in that it further includes the control section 220.

The control section 220 performs synchronization control of the channels of a measurement signal of the transmission block 130, the speed sensor unit 190, and the distance generation unit 210. Consequently, it becomes possible to synchronize movement speed information acquired by the speed sensor unit 190 and phase information acquired by the phase measurement block 110 with each other. More particularly, the control section 220 synchronizes the timing of a modulation process for a signal corresponding to each channel by the modulator 111 of the phase measurement block 110 and the measurement timing of the speed sensor unit 190 with each other. Consequently, it becomes possible for the distance generation unit 210 to perform correction of the phase difference indicated by the expressions (4) to (6) with a higher degree of accuracy, by using the speed information V synchronized with the phase difference information θm.

For example, the control section 220 performs control such that one of the modulator 111 of the phase measurement block 110 and the speed sensor unit 190 normally operates and operation of the other one of them is started in conformity with a measurement start timing of the phase difference θm. In this case, also does it become possible for the distance generation unit 210 to perform a process for synchronizing the timing of a modulation process of a signal corresponding to each channel and corresponding speed information. Further, in a case where the startup starting timing of the speed sensor unit 190 is adjusted to the timing of the modulation process of a signal corresponding to each channel by the modulator 111, it becomes possible to suppress the power consumption of the speed sensor unit 190.

Third Embodiment

The communication apparatus 1 according to the third embodiment is different from the communication apparatus 1 according to the first embodiment in that it further includes a direction sensor unit 230 and a movement direction calculation unit 240. In the following, differences from the communication apparatus 1 according to the first embodiment are described.

Figure 10:
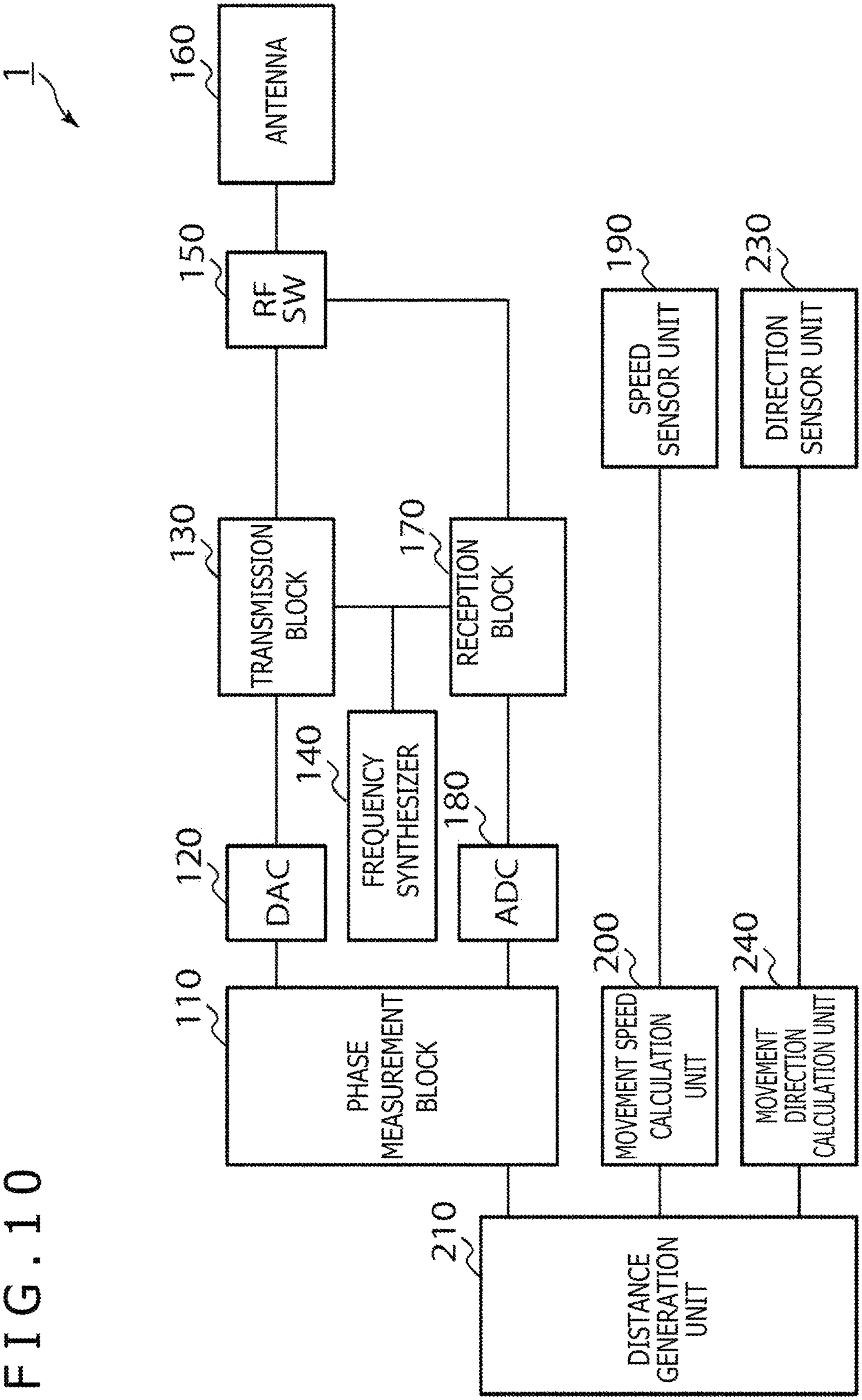
FIG. 10 is a diagram depicting an example of a configuration of a communication apparatus in a third embodiment.

FIG. 10 is a block diagram depicting an example of a configuration of the communication apparatus 1 in the third embodiment of the present technology. As depicted in FIG. 10, the communication apparatus 1 according to the third embodiment is different from the communication apparatus 1 according to the first embodiment in that it further includes the direction sensor unit 230 and the movement direction calculation unit 240.

The direction sensor unit 230 acquires information regarding a movement direction of the communication apparatus 1 with respect to the measurement target. It is possible to use a general direction sensor for the direction sensor unit 230. For example, it is possible to use a gyro sensor, an acceleration sensor, a geomagnetism sensor, or the like as the direction sensor unit 230. Further, it is possible to use, as the acceleration sensor, a composite sensor that includes an acceleration sensor represented, for example, by an inertial measurement unit (IMU) described hereinabove. Instead, a sensor that does not include an acceleration sensor may be used.

The movement direction calculation unit 240 calculates a traveling direction of the communication apparatus 1 in reference to an output signal of the direction sensor unit 230. It is to be noted that, in the description of the present embodiment, a scalar value of a velocity is referred to as speed. Further, the velocity is a vector value having a speed and information regarding a traveling direction.

As depicted in FIGS. 7A and 7B described hereinabove, in a case where the communication apparatus 1 moves toward the measurement target, an offset appears on the lower side. On the other hand, in a case where the communication apparatus 1 moves away from the measurement target, an offset appears on the upper side. Hence, in the expression (5), which is a correction expression described hereinabove, in reference to a direction calculated by the movement direction calculation unit 240, the distance generation unit 210 performs, in a case where the communication apparatus 1 is moving away from the measurement target, a calculation for indicating the moving distance DV with the positive sign, but performs, in a case where the communication apparatus 1 is moving toward the measurement target, a calculation for indicating the moving distance DV with the negative sign. It is to be noted that, in a case where the direction of the communication apparatus 1 with respect to the measurement target and the direction calculated by the movement direction calculation unit 240 are displaced from each other, the expressions (1) to (8) may be corrected and calculated by trigonometry.

Figure 11:
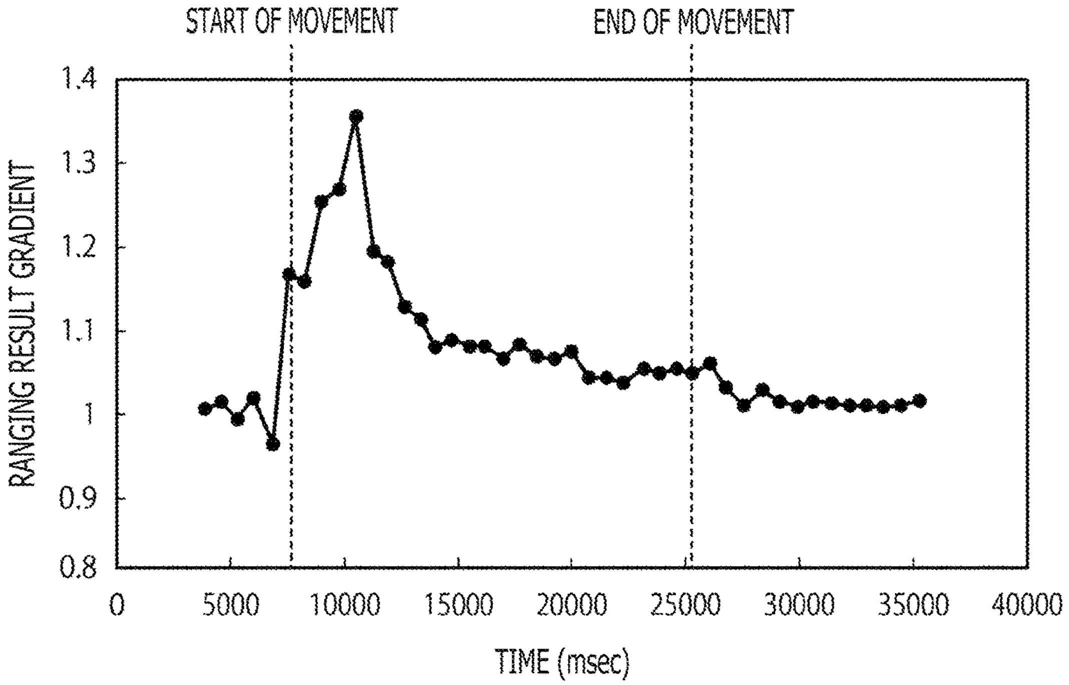
FIG. 11 is a diagram depicting fluctuation of the distance calculated by a distance generation unit in a case where direction information is not used.

FIG. 11 is a diagram depicting fluctuation of the distance calculated by the distance generation unit 210 in a case where direction information is not used. In particular, in a case where the time differentiation of the distance increases, this is indicated by a value greater than 1, but in a case where the time differentiation of the distance decreases, this is indicated by a value smaller than 1. The value 1 signifies a stop. As depicted in FIG. 11, also in a case where direction information is not used, whether the communication apparatus 1 is moving toward the measurement target or is moving away from the measurement target can be determined from the distance information calculated by the distance generation unit 210.

Hence, it is also possible for the distance generation unit 210 in the present embodiment to determine that the communication apparatus 1 is moving away from the measurement target when the time differentiation of the distance calculated without use of the direction information increases and that the communication apparatus 1 is moving toward the measurement target when the time differentiation decreases. Accordingly, the distance generation unit 210 newly performs a calculation for indicating in the expression (5), in a case where it is determined that the communication apparatus 1 is moving away from the measurement target, the moving distance DV with the positive sign, but indicating in the expression (5), in a case where it is determined that the communication apparatus 1 is moving toward the measurement target, the moving distance DV with the negative sign. Consequently, also in a case where the direction sensor unit 230 is not provided, a distance with a direction taken into consideration can be generated.

Figure 12:
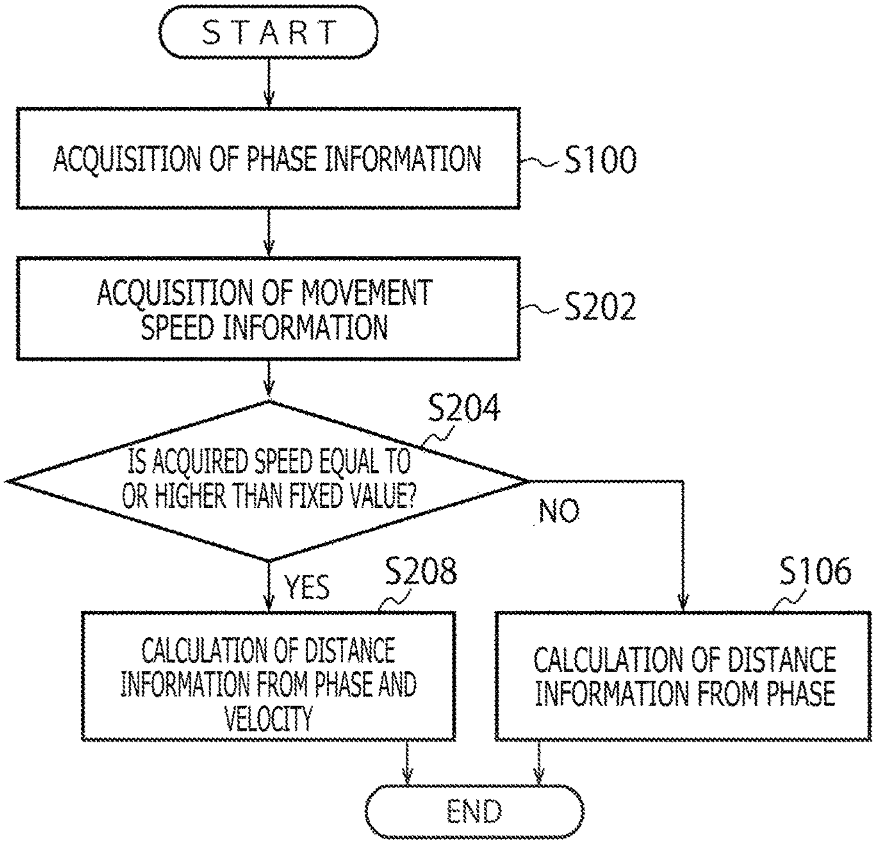
FIG. 12 is a flow chart depicting an example of processing of the communication apparatus according to the third embodiment.

FIG. 12 is a flow chart that indicates an example of processing of the communication apparatus 1 according to the third embodiment. As depicted in FIG. 12, after the process in step S100 (refer to FIG. 8) is performed, the distance generation unit 210 acquires speed information regarding the communication apparatus 1 during frequency sweep from the movement speed calculation unit 200 and acquires direction information from the movement direction calculation unit 240 both as velocity information (step S202).

Next, the distance generation unit 210 determines whether or not the speed of the communication apparatus 1 is equal to or higher than a predetermined value by using the speed information regarding the communication apparatus 1 during frequency sweep (step S204).

Thereafter, in a case where the speed of the communication apparatus 1 is lower than the predetermined value (No in step S204), the distance generation unit 210 performs the process in step S106 (refer to FIG. 8), and then ends the processing. On the other hand, in a case where the speed of the communication apparatus 1 is equal to or higher than the predetermined value (Yes in step S204), the distance generation unit 210 calculates distance information, for example, according to the expressions (4) to (8) by using the speed information and the direction information (step S208), and then ends the processing.

As described above, the communication apparatus 1 according to the present embodiment generates information regarding a traveling direction with respect to the measurement target for every measurement. Consequently, also in a case where the traveling direction with respect to the measurement target is indefinite, it is possible for the distance generation unit 210 to accurately perform correction calculation based on the expression (5) by using the generated information regarding the traveling direction. Therefore, the distance to the measurement target can be calculated with a higher degree of accuracy.

Note that the present technology can also take the following configurations.

(1)

A communication apparatus including:

- a phase acquisition unit that acquires a phase characteristic of a frequency in a propagation channel with a different communication apparatus;
- a distance generation unit that generates distance information in reference to the phase characteristic; and
- a speed sensor unit that measures a movement speed of a transmission side of the propagation channel, the movement speed being usable for correction of the phase characteristic.

(2)

The communication apparatus according to (1), in which the distance generation unit generates the distance information in reference to the phase characteristic and the movement speed.

(3)

The communication apparatus according to (1) or (2), in which the distance generation unit generates the distance information by using group delay information based on at least two phase differences of different frequencies in the propagation channel.

(4)

The communication apparatus according to (2) or (3), in which the distance generation unit corrects the phase characteristic by the movement speed.

(5)

The communication apparatus according to any one of (1) through (4), in which the speed sensor unit includes at least any one of an acceleration sensor and an inertial measurement device in which multiple sensors are combined.

(6)

The communication apparatus according to any one of (1) through (5), in which the speed sensor unit measures the movement speed in synchronism with the acquisition of the phase characteristic.

(7)

The communication apparatus according to any one of (1) through (6), in which a BLE communication method is used for transmission and reception of the propagation channel.

(8)

The communication apparatus according to (4), in which the distance generation unit corrects the phase characteristic according to a movement direction based on a time change of the distance information.

(9)

The communication apparatus according to any one of (1) through (8), further including:

a direction sensor unit that measures a movement direction of the transmission side of the propagation channel.

(10)

The communication apparatus according to (9), in which the distance generation unit corrects the phase characteristic in reference to the movement speed and the movement direction.

(11)

The communication apparatus according to (1), in which the phase acquisition unit measures the phase characteristic by transmission and reception to and from the different communication apparatus.

(12)

The communication apparatus according to (11), further including:

an antenna used for transmission and reception to and from the different communication apparatus, in which the phase acquisition unit generates the phase characteristic in reference to transmission and reception signals through the antenna.

(13)

A communication system including:

first and second communication apparatuses that transmit and receive a measurement signal to and from each other, in which the first communication apparatus includes a phase acquisition unit that acquires a phase characteristic of a frequency in a propagation channel when the measurement signal is transmitted to or received from the second communication apparatus, a distance generation unit that generates distance information in reference to the phase characteristic, and a speed sensor unit that measures a movement speed of a transmission side of the propagation channel, the movement speed being usable for correction of the phase characteristic.

(14)

A communication method including the steps of:

generating a phase characteristic of a frequency in a propagation channel with a different communication apparatus;

measuring a movement speed of a transmission side of the propagation channel; and correcting the phase characteristic by the movement speed to generate distance information.

The mode of the present disclosure is not limited to the individual embodiments described hereinabove and includes various alterations that can be conceived of by those skilled in the art, and also the advantageous effects of the present disclosure are not limited to the contents described hereinabove. In particular, various additions, changes, and partial deletions are possible without departing from the conceptive idea and the subject matter of the present disclosure that are derived from the contents defined in the claims and equivalents to them.

REFERENCE SIGNS LIST

1: Communication apparatus
110: Phase measurement block
115: Phase measurement unit
160: Antenna
190: Speed sensor unit
210: Distance generation unit
230: Direction sensor unit

The invention claimed is:

1. A communication apparatus comprising:

a phase acquisition unit that acquires a phase characteristic of a frequency in a propagation channel with a different communication apparatus;

a distance generation unit that generates distance information in reference to the phase characteristic; and a speed sensor unit that measures a movement speed of a transmission side of the propagation channel, the movement speed being usable for correction of the phase characteristic, wherein the phase characteristic is one of a plurality of phase characteristics, the speed sensor unit comprises an acceleration sensor or an inertial measurement unit (IMU), and a control section is configured to synchronize timing of speed measurements with timing of acquisition of respective phase characteristics corresponding to a plurality of channels, such that the respective phase characteristics are corrected per channel using synchronized movement speeds.

2. The communication apparatus according to claim 1, wherein the distance generation unit generates the distance information in reference to the phase characteristic and the movement speed.

3. The communication apparatus according to claim 2, wherein the distance generation unit corrects the phase characteristic by the movement speed.

4. The communication apparatus according to claim 3, wherein the distance generation unit corrects the phase characteristic according to a movement direction based on a time change of the distance information.

5. The communication apparatus according to claim 1, wherein the distance generation unit generates the distance information by using group delay information based on at least two phase differences of different frequencies in the propagation channel.

6. The communication apparatus according to claim 1, wherein the speed sensor unit comprises the acceleration sensor and the IMU.

7. The communication apparatus according to claim 1, wherein the speed sensor unit measures the movement speed in synchronism with an acquisition of the phase characteristic.

8. The communication apparatus according to claim 1, wherein a Bluetooth Low Energy (BLE) communication method is used for transmission and reception of the propagation channel.

9. The communication apparatus according to claim 1, further comprising:

a direction sensor unit that measures a movement direction of the transmission side of the propagation channel.

10. The communication apparatus according to claim 9, wherein the distance generation unit corrects the phase characteristic in reference to the movement speed and the movement direction.

11. The communication apparatus according to claim 1, wherein the phase acquisition unit measures the phase characteristic by transmission and reception to and from the different communication apparatus.

12. The communication apparatus according to claim 11, further comprising:

an antenna used for transmission and reception to and from the different communication apparatus, wherein the phase acquisition unit generates the phase characteristic in reference to transmission and reception signals through the antenna.

13. A communication method comprising:

generating a phase characteristic of a frequency in a propagation channel with a different communication apparatus;

measuring a movement speed of a transmission side of the propagation channel;

correcting the phase characteristic by the movement speed to generate distance information, wherein the phase characteristic is one of a plurality of phase characteristics, and measuring the movement speed uses an acceleration sensor or inertial measurement unit (IMU); and synchronizing timing of speed measurements with timing of acquisition of respective phase characteristics corresponding to a plurality of channels, such that the respective phase characteristics are corrected per channel using synchronized movement speeds.

14. The communication method according to claim 13, wherein:

measuring the movement speed uses the acceleration sensor and the IMU.

15. The communication method according to claim 13, further comprising:

measuring a movement direction of the transmission side of the propagation channel; and correcting the phase characteristic in reference to the movement speed and the movement direction.

16. A non-transitory computer readable medium storing a program for communication, the program being executable by a processor to perform operations comprising:

generating a phase characteristic of a frequency in a propagation channel with a different communication apparatus;

measuring a movement speed of a transmission side of the propagation channel;

correcting the phase characteristic by the movement speed to generate distance information, wherein the phase characteristic is one of a plurality of phase characteristics, and measuring the movement speed uses an acceleration sensor or inertial measurement unit (IMU); and synchronizing timing of speed measurements with timing of acquisition of respective phase characteristics corresponding to a plurality of channels, such that the respective phase characteristics are corrected per channel using synchronized movement speeds.

17. The non-transitory computer readable medium according to claim 16, wherein measuring the movement speed uses the acceleration sensor and the IMU.

18. The non-transitory computer readable medium according to claim 16, wherein the operations further comprise:

measuring a movement direction of the transmission side of the propagation channel; and correcting the phase characteristic in reference to the movement speed and the movement direction.

* * * * *